Aug. 2, 1955
K. L. BRIMHALL
2,714,263
LATCH FOR SCRAPER BOWLS
Filed Aug. 11, 1950
4 Sheets-Sheet 1
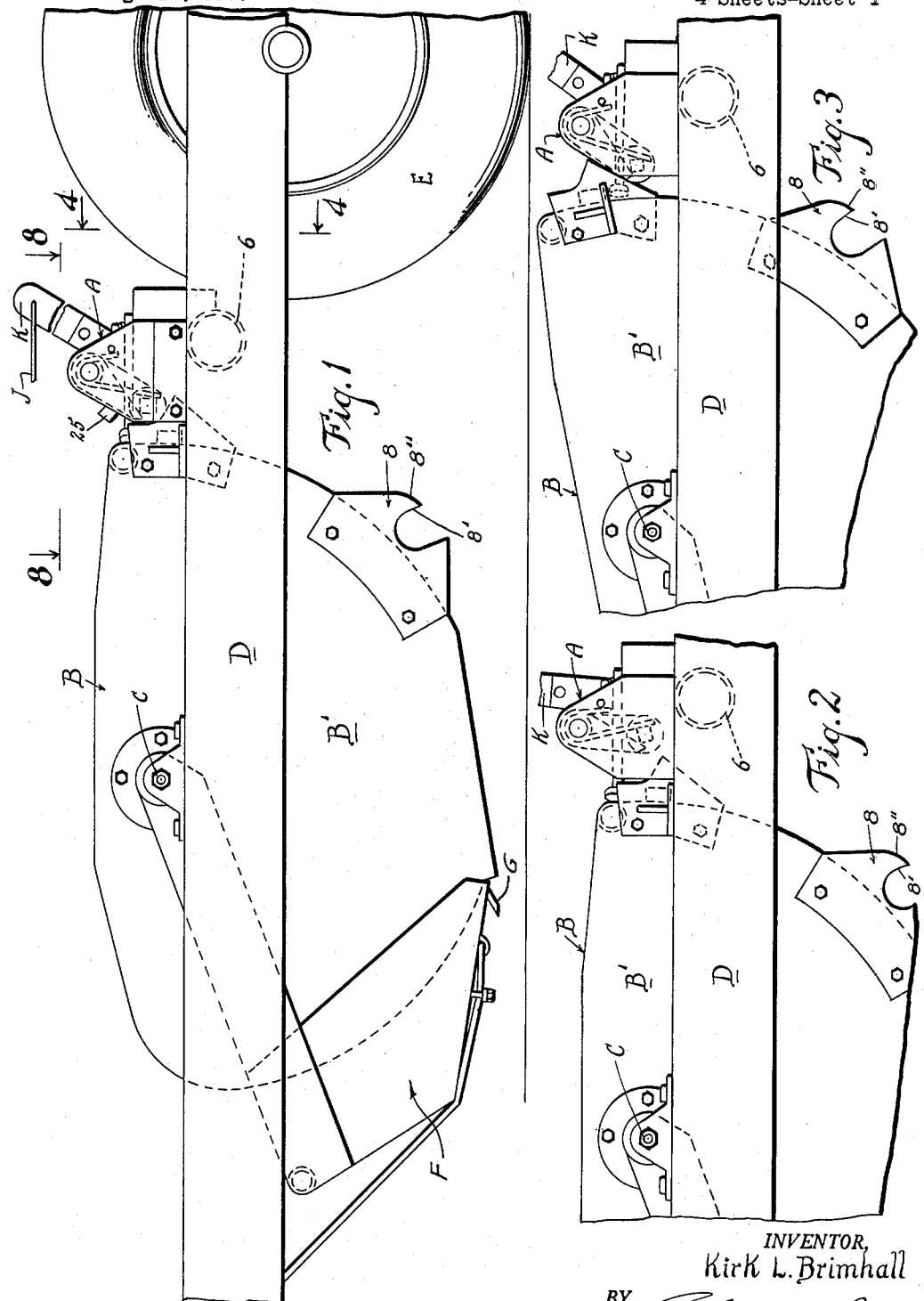
INVENTOR,
Kirk L. Brimhall
BY
AGENT.

Aug. 2, 1955 K. L. BRIMHALL 2,714,263
LATCH FOR SCRAPER BOWLS
Filed Aug. 11, 1950 4 Sheets-Sheet 2
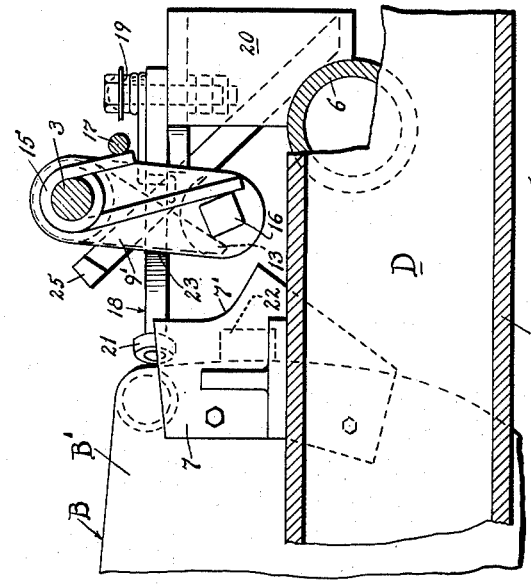
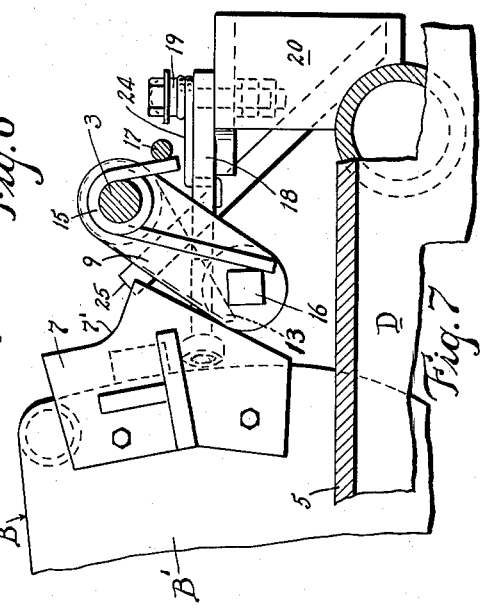
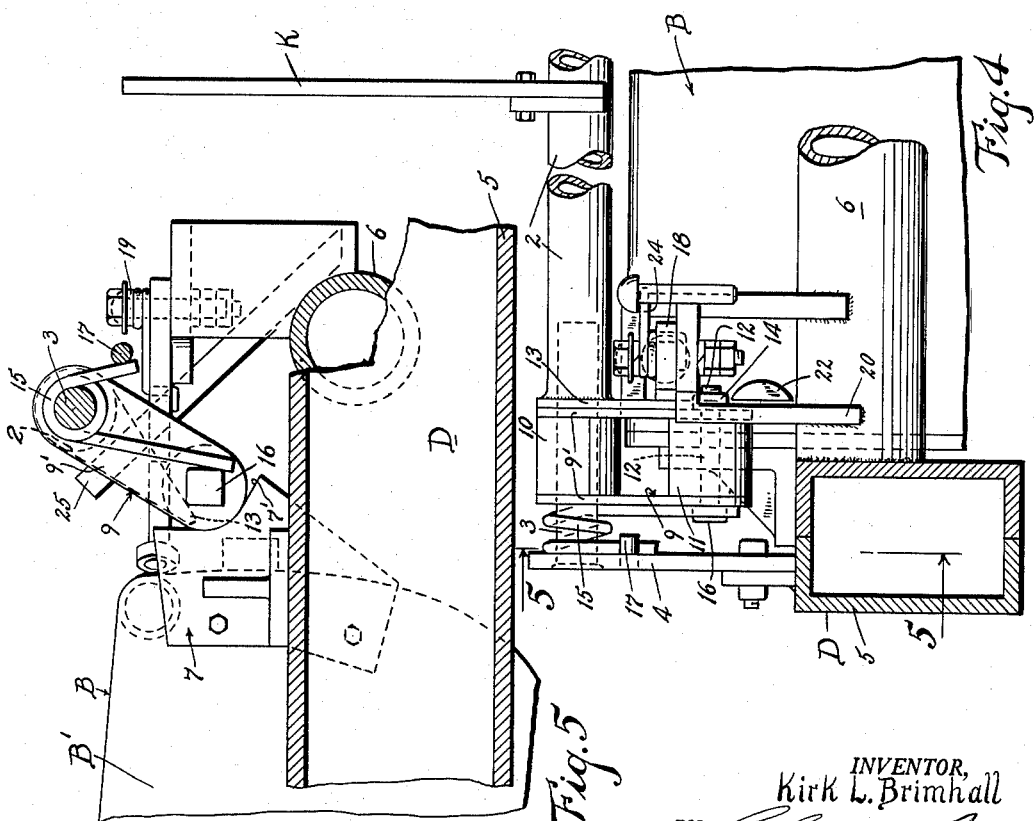
INVENTOR,
Kirk L. Brimhall
BY
AGENT.

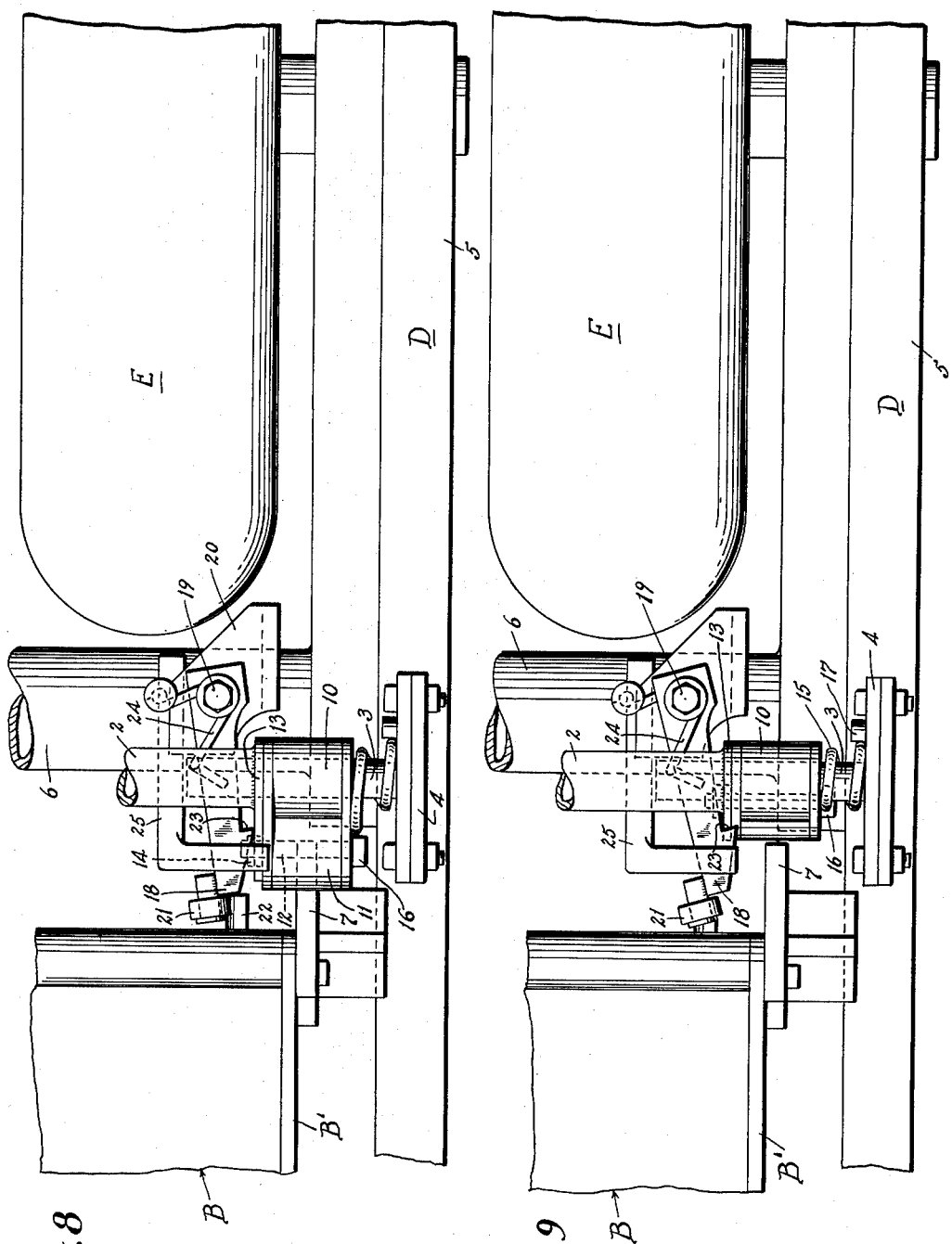

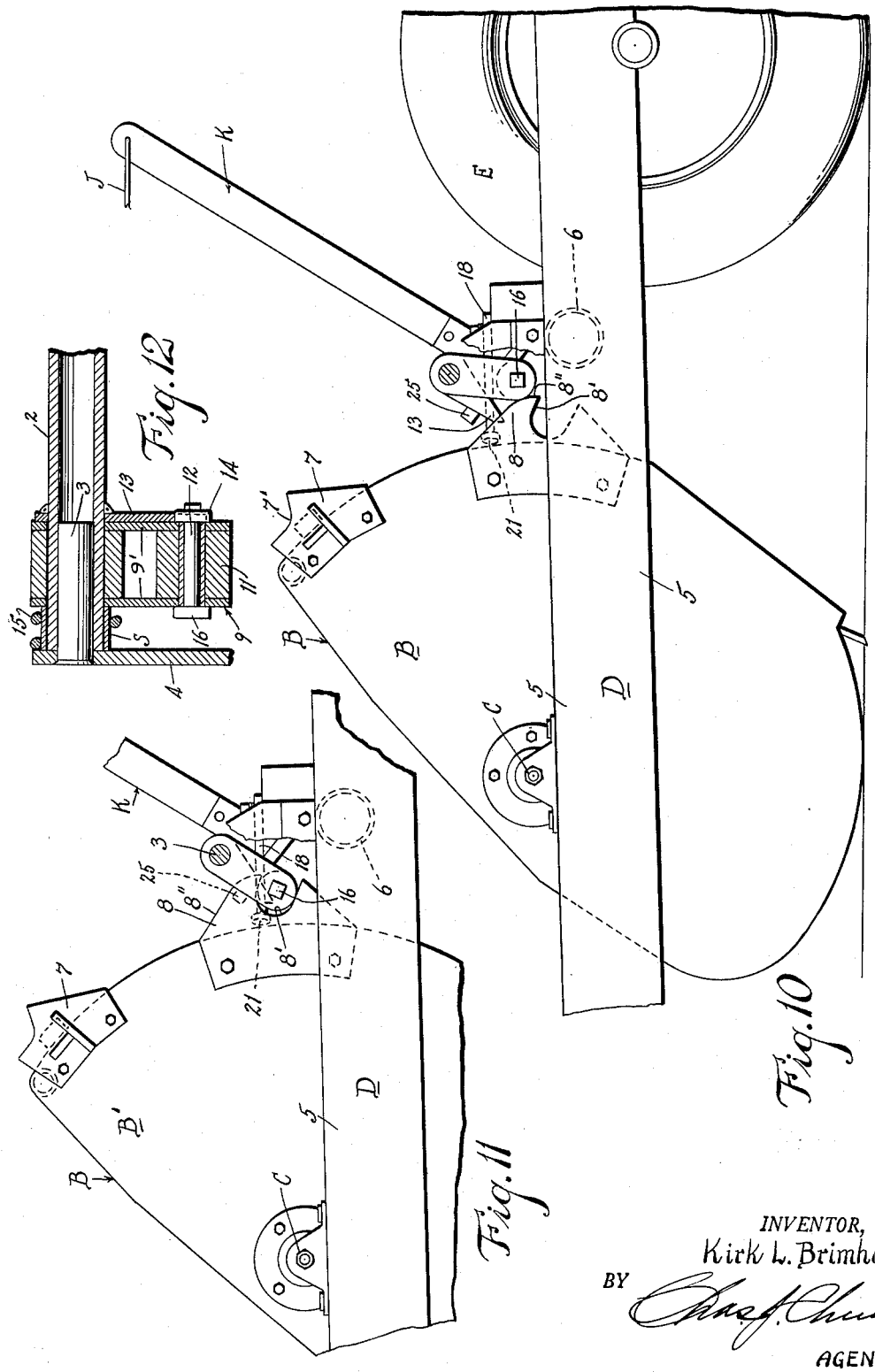

United States Patent Office 2,714,263
Patented Aug. 2, 1955

2,714,263

LATCH FOR SCRAPER BOWLS

Kirk L. Brimhall, Torrance, Calif., assignor, by mesne assignments, to Western Equipment Mfg. Co., Glendale, Calif., a corporation of California Application August 11, 1950, Serial No. 178,854

6 Claims. (Cl. 37—126)

This invention relates to bowl latch mechanism for hauling scrapers of the type wherein a wheel supported and vertically movable frame carries a bowl which is moved with as well as relative to the frame to occupy positions for loading, carrying, dumping and leveling operations under control of the driver of a tractor to which the scraper is hitched.

In scrapers of this type, the frame is raised and lowered by power derived from the tractor and controlled by a lever on the tractor from the driver's seat, whereby the scraper blade on the bowl may be moved into and out of contact with the ground.

These scrapers are also provided with a latch means to prevent tilting of the bowl relative to the frame when the bowl is in the one position it occupies for both loading and load-carrying operations, as well as when the bowl is in the other position it occupies for both dumping and leveling operations, said latch means operating automatically each time the bowl is tilted into these positions. Release of the latch means is effected by a trip means accessible to the driver of the tractor.

In dumping the bowl of a scraper of this type, the operator must pull on and hold the trip line with one hand to maintain the latch released while manipulating the hydraulic lever with the other hand to lower the frame so that the scraper blade will contact the ground while the tractor is moving forwardly, inasmuch as it is this contact of the blade with the ground while the operator holds the latch released, that causes the bowl to be tilted relative to the frame into position for dumping and leveling operations. Thus it is seen that this operation requires that both hands of the driver be removed from the steering wheel and that the driver look backward to gauge the operation, thereby leaving the steering wheel unattended and creating a dangerous driving hazard, especially when working near embankments on levees and near the edge of any elevated terrain.

If the tractor is stopped to set the bowl for dumping, then started, objectionable if not damaging strains are set up and the dumping, spreading and leveling operations cannot be controlled in the desired manner that is possible when these operations are carried out while the scraper is being moved forwardly, since the momentum of the bowl causes it to tilt easily and without objectionable strain on the tractor or scraper, when the blade contacts the ground during forward movement of the scraper and inasmuch as continued forward movement of the scraper makes it possible to dump the load evenly and to spread and level the dirt uniformly.

It is therefore the primary object of this invention to provide a latch mechanism for scrapers of the type hereinbefore described, which enables the driver of the tractor to maintain full control of the steering wheel and to give requisite attention to a safe operation of the tractor and scraper while effecting and controlling the several operations of the scraper without arresting the forward movement at the desired rate, thereby eliminating the objections and hazards heretofore encountered and assuring a safe and more efficient operation of both the tractor and the scraper.

Another object of this invention is to provide a bowl latch mechanism wherein a lock-out means automatically holds the latch means in bowl-releasing position incident to the tripping of the latch means by the driver of the tractor to release the bowl; and wherein a bowl-actuated trip means releases the lock-out means when the bowl is tilted between the two positions in which it is held by the latch means, whereby on reaching either of said two positions, the bowl will be automatically latched against tilting. As a result of this automatic lock-out and subsequent automatic release of the latch means, the driver of the tractor when nearing the point where it is desired to dump the bowl, may operate the trip to release the latch means which is then held by the lock-out means in releasing position, after which, without stopping the forward movement of the scraper or looking backward, the driver may operate the control lever to lower the bowl so that the blade will contact the ground and cause the bowl to tilt and dump the load uniformly as the scraper continues forward movement. When the bowl in being tilted reaches a position between load carrying position and dumping position, the bowl-actuated trip means releases the lock-out means so that when the bowl reaches dumping position, the latch means will operate automatically to hold the bowl in dumping position. When the dumping or leveling operation is completed the driver of the tractor again operates the trip to release the latch and when the frame is lifted to lift blade from the ground, the bowl will gravitate into its loading and load-carrying position. When the bowl swings into this position, the lock-out means is released and the latch means is therefore operative to automatically lock the bowl in said loading position.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a fragmentary side elevation of a hauling scraper as equipped with a bowl latch embodying the present invention and shown as latching the bowl carrying position, Fig. 2 is a fragmentary side elevation similar to Fig. 1, showing the latch in bowl-releasing position, Fig. 3 is a fragmentary side elevation similar to Fig. 3 showing the bowl-actuated trip means as releasing the lock-out means when the bowl is between positions in which it is held by the latch, Fig. 4 is an enlarged sectional view taken on the line 4—4 of Fig. 1, Fig. 5 is a sectional view taken on the line 5—5 of Fig. 4, Fig. 6 is a sectional view corresponding to Fig. 5, showing the latch means held out of latching position by the lock-out means, Fig. 7 is sectional view corresponding to Figs. 5 and 6 but with the bowl in the position in which the bowl-actuated trip means has released the lock-out means and restored the latch for latching the bowl when it reaches loading position or dumping position, Fig. 8 is a fragmentary top plan view looking downwardly from the line 8—8 of Fig. 1 and showing the latch in the latching position shown in Fig. 1, Fig. 9 is a sectional view corresponding to Fig. 8 but showing the latch held in releasing position by the lock-out means, Fig. 10 is a fragmentary side-elevation of the scraper with the bowl about to be latched in dumping position, Fig. 11 is a view corresponding to Fig. 10 with the bowl latched in dumping position, and Fig. 12 is a fragmentary vertical section of a modified construction of the latch mechanism.

As shown in the accompanying drawing my improved latch mechanism A is applied to a hauling scraper wherein a bowl B is pivoted as at C to a frame D supported at its rear end by means of wheels E. An apron F provided for opening and closing the bowl is also pivoted at C and operated in a manner well known in this art.

The bowl B is adapted to be tilted from carrying position shown in Fig. 1, into dumping position shown in Fig. 11, and vice versa, the weight of the bowl being distributed to cause it to gravitate from dumping position into carrying position when the frame is lifted to clear the scraper blade G from the ground. Tilting of the bowl from load-carrying position into dumping position is effected by lowering the frame until the blade contracts the ground while the scraper is being moved forwardly by the tractor (not shown) to which the scraper is hitched. The frame is raised and lowered by means of a hydraulic hitch means (not shown) which is standard equipment on certain tractors and well known in this art, being controlled by a lever adjacent the driver's seat on the tractor. The bowl, as is customary in scrapers of this type, is constructed and so pivoted at C, that it will balance in the loading-carrying position when the latch is released, so as to prevent tilting and spilling of the load before the bowl is disposed in dumping position.

A manually operable trip means is operated from the tractor (being shown in part in the drawing) for releasing the latch means A and includes a rope or like line J leading from the tractor to a trip lever K which is operatively connected to the latch means in a manner which will now be described.

As shown in Fig. 4, the trip lever K is fixed to a tubular horizontal shaft 2 rotatably mounted on bearing pins 3 carried by brackets 4 fixed on the side bars 5 of the frame D at points rearwardly of the bowl. Fig. 4 shows how the shaft 2 is disposed between the side bars 5 above a cross member 6 of the frame, with the lever K fixed intermediate the ends of the shaft. Fig. 12 shows the preferred mounting of the shaft 2 wherein the ends of the shaft abut the brackets 4 after passing through the latch mechanism A instead of being welded to the latch mechanism as shown in the other views throughout the drawings.

The latch mechanism A includes like units at the ends of the shaft 2 and as these units are identical and are substantially in line with the opposite sides of B' of the bowl B, only one unit is shown in the drawings. Likewise each side B' of the bowl is provided alike with latch plates 7 and 8, and one side B' and one set of the latch plates 7 and 8 are shown in the drawing, it being understood that the latch mechanisms are the same on both sides of the scraper and are simultaneously operated.

The latch mechanism A on each side of the scraper includes a latch arm 9 which is mounted to swing about the axis of the bearing pins 3 into and out of latching contact with the latch plates 7 and 8. The preferred mounting of the arms 9 as shown in Fig. 12 requires that the arms swing about the axis of the shaft 2 which passes through said arms. However, in the mounting of the arms 9 as shown in the other views of the drawing as well as in Fig. 12, said arms are free to swing relative to the shaft 2 and are subject to being moved responsive to turning of the shaft in a manner and for the purpose which will be hereinafter fully described.

Each arm 9 is made up of a pair of opposed arm members 9' having a spacer sleeve 10 between their upper ends and a roller 11 supported on a bolt 12 at their lower ends. The bearing pins 3 support the arm members 9 being extended through the upper ends thereof and the spacer sleeve 10. However, the arm members 9' may be supported as shown in Fig. 12 with the shaft extending there-thru and thru the sleeve.

As a means for moving each latch arm 9 out of latching position, a crank arm 13 is welded to the shaft 2 to turn therewith and bears against the nut 14 which holds the bolt 12 in place. A spring 15 is coiled around the bearing pin 3 with one end abutting the head 16 of the bolt 12 and the other end bearing against a stop pin 17 on the bracket 4 so that the latch arm 9 is urged forwardly to maintain the nut 14 against the crank arm 13. With this arrangement, when the trip line is pulled by the operator of the tractor and the shaft 2 is turned, the crank arm 13 will swing rearwardly and in bearing against the nut 14 will swing the latch arm 9 rearwardly out of contact with the latch plate with which the arm 9 has been engaged.

The springs 15, bearing in mind that one of the springs 15 is at each end of the shaft 2, normally act to yieldably hold the arms 9 in latching position and to return the trip lever and shaft 2 to normal position in which the arms 9 are disposed in latching position, when the operator releases the trip line J after having pulled it to move the latch arms out of latching position.

The latch plates 7 are adjacent the upper edges of the sides B' of the bowl and have rounded shoulders 7' which abut the rollers 11 on the latch arms 9 as shown in Figs. 1, 5 and 8 to hold the bowl against movement out of position in which the loading and load-carrying operations are carried out. The latch plates 8 are mounted adjacent the bottom of the bowl and have notches or recesses 8' therein to receive the rollers 11 on the latch arms 9 to lock the bowl in dumping position as shown in Fig. 11. The plates 8 also have cam edges 8" which, as will be hereinafter described, move the arms 9 rearwardly away from the crank arms 13 when the bowl is being tilted into dumping position as shown in Fig. 10. However, the roller 11 will ride on these cam edges 8" and snap into the notches to latch the bowl as shown in Figure 11.

A lock out means is provided for holding the latch arms out of latching position each time the trip line J is pulled to move the latch arms out of latching position. This means for each latch unit, includes a spring-loaded detent arm 18 pivoted as at 19 at one end to a bracket 20 welded on the cross member 6 of the scraper frame. The outer end of the detent arm 18 is provided with a roller 21 adapted to cooperate with a double or two-way cam 22 on the back of the bowl. When the roller 21 engages the cam 22, the detent arm 18 is moved so that a shoulder or hook portion 23 thereon is moved to release the latch arm 9. A spring 24 is coiled about the pivot 19 and arranged to urge the arm 18 into position to lock the latch arm 9 against returning to latching position. Figs. 2, 6, and 9 show the detent arm 18 in position to hold the latch arm 9 out of latching position. Fig. 8 shows the detent arm 18 in releasing position and bearing against a side of the latch arm 9 in readiness to be urged by the spring 24 into the operative position shown in Figs. 6 and 9 when the latch arm is retracted to release the bowl.

An L-shaped stop member 25 is fixed on the bracket 20 and limits the movement of the arm 9 to latching position as will be seen with reference to Figs. 5, 6 and 8.

Assuming that the bowl B is latched in load-carrying position as shown in Fig. 1, with a load of dirt therein, and the tractor operator desires to dump and spread the load while moving the scraper forwardly, the trip line J is pulled by the operator before he reaches the point where it is desired to dump the load and this requires that only one hand of the operator be removed from the steering wheel.

When the trip line is pulled to turn the shaft 2, the crank arms 13 on the shaft are swung rearwardly and move the latch arms 9 out of latching contact with the latch plates 7 on the bowl B. When the latch arms 9 are retracted in this manner, the detent arms 18 are moved inwardly by the springs 24 so that the shoulders 23 will abut the arms 9 and hold them retracted, thereby making it unnecessary for the tractor operator to hold the trip line after the initial quick pull thereon to retract the latch arms 9.

The operator now manipulates the control lever, on the tractor to lower the frame and bowl so that the scraper blade on the bowl will contact the ground. As the forward movement of the scraper continues, the bowl will be tilted to dump the load and spread it evenly. This operation like the latch release operation does not require that both hands of the operator be removed from the wheel, nor that the operator turn and look backward.

When the bowl begins to tilt from carrying position into dumping position, the bowl carried cam 22 engages the rollers 21 on the latch arms 18 so as to move said arms out of holding position, thereby releasing the latch arms 9 which as shown in Fig. 6 will swing inwardly under urge of the springs 15 and ride on the edges of the latch plates 7 and then on the back of the bowl as the tilting of the bowl continues. In the present instance the cam 22 is located below the shoulders 7' of the plates 7 and adjacent thereto but it should be understood that the cam may be located at any point on the back of the bowl between the plates 7 and 8, provided it will contact the detent arm rollers 21 and move the detent arms 18 out of holding position before the bowl reaches positions in which the latch plates 7 and 8 come into latching positions relative to the arms 9.

When the bowl, in being tilted into dumping position, reaches the position shown in Fig. 10, the cam edges 8'' of the plates 8 engage and push rearwardly the arms 9 but these arms will snap into the notches 8' in the plates 8 when the bowl reaches full dumping position as shown in Fig. 11, thereby holding the bowl against being tilted out of dumping position.

When the dumping and spreading operations are finished and it is desired to return the bowl to position for loading, the control lever on the tractor is manipulated to raise the frame and lift the bowl and blade clear of the ground after which the operator pulls on the trip line J and retracts the arms 9 from latching contact with the plates 8. The detent arms 18 of the lock-out means respond to this tripping of the latch arms and lock the latch arms in retracted position. As soon as it is released the bowl will gravitate into loading position and in so moving causes the cam 22 to contact the rollers 21 and move the detent arms 18 out of holding position before the shoulders 7' come opposite the arms 9, so that the latter will snap into latching position as shown in Figures 1, 5, and 8.

It should be noted that as shown in Fig. 12, the springs 15 are coiled around the freely rotatable sleeve S to avoid friction and weakening of the springs.

It will now be apparent that the latch means of this invention as a simple and reliable mechanism will provide the objects and advantages hereinbefore noted in a particularly efficacious manner.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a hauling scraper, a frame, a bowl pivotally mounted on the frame for movement to occupy different positions, latch means including a movable latch member on the frame and a latch element on the bowl arranged to latch the bowl in said different positions, manually operable trip means operable on said frame for engaging and moving said latch member out of latching position to release the bowl, a lock-out member pivoted on the frame for movement to releasably hold said latch member out of latching position, spring means operatively connected with said frame and said latch member, respectively, for urging said latch member into latching position, spring means operatively connected with said frame and said lock-out member respectively for urging said lock-out member into position to hold the latch member out of latching position; and a bowl carried trip member which when the bowl is moved in either direction between said different positions thereof, will contact and move said lock-out member so as to release said latch member for latching the bowl.

2. In a hauling scraper, a frame, a bowl mounted on the frame for movement to occupy different positions, a latch means including spring-loaded latch members pivoted on the frame and cooperative latch elements fixed adjacent the rear of the bowl for releasably holding the bowl in said positions, manually operable trip means operable on said frame for moving said latch members into bowl-releasing position, spring-loaded lock-out members mounted on the frame urged into position for engaging and holding the latch members out of latching position when said trip means is operated to release the bowl, and cam means on the bowl operating to move the lock-out members to release said latch members during movement of the bowl between said different positions.

3. In a hauling scraper, a frame, a bowl mounted on the frame for movement from a position for loading and carrying a load into a position for dumping the load and vice versa, a pair of latch elements mounted on the bowl, latch members pivotally mounted on the frame for cooperation with said latch elements to releasably hold the bowl in said positions, trip means operable on the frame for moving said latch member clear of said latch elements to free the bowl for movement into and out of said positions, detent members on the frame locking said latch members in bowl-releasing position in response to movement of said latch members into bowl releasing position, and a trip member mounted on the bowl so as to contact and move the detent members for releasing said latch members when the bowl is moved in either direction between the positions in which it is held by said latch members.

4. In a hauling scraper, a frame, a bowl pivotally mounted on the frame for movement into different positions, latch elements mounted on the bowl, a shaft rotatably mounted on the frame rearwardly of the bowl, a latch arm mounted on the frame to turn about the axis of said shaft into and out of latching engagement with the latch elements on the bowl, a crank arm fixed to said shaft for contacting and moving the latch arm out of latching position on the turning of the shaft in one direction, a trip means operable on the frame for turning said shaft in said one direction so as to move the latch arm out of latching position, spring means operatively connected with said frame and said latch arm, respectively, for urging said latch arm into latching contact with said latch elements, said latch arm and said crank arm being arranged so that the latch arm is movable relative to the crank arm against the action of said spring means; lock-out means on the frame operating when the latch arm is moved out of latching position to hold the latch arm in such position, and trip means on the bowl operating when the bowl is moved between said different positions, to move the lock-out means so as to release the latch arm.

5. In a hauling scraper, a frame, a bowl pivotally mounted on the frame for movement into different positions, latch elements mounted on the bowl, a shaft rotatably mounted on the frame adjacent the bowl, latch arms mounted to turn freely about the axis of said shaft into and out of latching engagement with the latch elements on the bowl, crank arms fixed to said shaft to turn therewith, said crank arms contacting portions of the latch arms on one side of the axis of the latch arms for moving the latter out of latching engagement with the latch elements on the bowl, spring means operatively connected with said frame and said latch arms, respectively, for urging said latch arms against said crank arms and toward said latch elements; and trip means operable on the frame for turning said shaft so as to move the crank arms against said latch arms and moving the latch arms against the action of said spring means out of latching engagement with said latch elements.

6. In a hauling scraper, a frame, a bowl mounted on the frame for movement into different positions, latch elements mounted on the bowl, a shaft rotatably mounted on the frame adjacent the bowl, latch arms mounted on said shaft to turn freely about the axis of said shaft into and out of latching engagement with the latch elements on the bowl, crank arms fixed to said shaft to turn therewith, said crank arms contacting portions of the latch arms on one side of the axis of the latch arms for moving the latter out of latching engagement with the latch elements on the bowl, spring means operatively connected with said frame and said latch arms, respectively for urging said latch arms against said crank arms and toward said latch elements; trip means operable on said frame for turning said shaft so as to move the crank arms against said latch arms and moving the latch arms against the action of said spring means out of latching engagement with said latch elements, and rollers on said latch arms arranged to ride on the bowl and to come into latching engagement with said latch elements.

References Cited in the file of this patent

UNITED STATES PATENTS

| | | |
|---|---|---|
| 2,080,218 | Wilson | May 11, 1937 |
| 2,096,207 | Stewart | Oct. 19, 1937 |
| 2,300,843 | Norwood et al. | Nov. 3, 1942 |
| 2,348,117 | Elliott | May 2, 1944 |
| 2,451,380 | Curtiss | Oct. 12, 1948 |
| 2,587,487 | Koop | Feb. 26, 1952 |